United States Patent [19]
Delorenzo

[11] 3,883,701
[45] May 13, 1975

[54] EYEGLASS FRAME WITH HEARING AID
[76] Inventor: Anthony Delorenzo, 19236 Grand River, Detroit, Mich. 48223
[22] Filed: Mar. 18, 1971
[21] Appl. No.: 125,480

[52] U.S. Cl. .............................................. 179/107 S
[51] Int. Cl. ............................................ G02c 11/06
[58] Field of Search ...... 179/107 S; 339/257, 258 C

[56] References Cited
UNITED STATES PATENTS

| 1,821,443 | 9/1931 | Mohr | 339/258 C |
| 2,794,085 | 5/1957 | De Angelis | 179/107 S |
| 3,035,127 | 5/1962 | Strzalkowski | 179/107 S |
| 3,210,483 | 10/1965 | Martin et al. | 179/107 S |
| 3,604,861 | 9/1971 | Lewis et al. | 179/107 S |

Primary Examiner—Thomas W. Brown
Attorney, Agent, or Firm—Barnes, Kisselle, Raisch & Choate

[57] ABSTRACT

An eyeglass frame with a hearing aid which provides for a microphone being positioned in one temple and the amplifier in the other temple with electrical connections therebetween. Each temple is mechanically connected to a temple tip hinged to the frame front so that when the mechanical connection is broken to remove the temple from the temple tip, the electrical connections are also broken, thereby permitting ready removal and replacement of the temple with the electrical element therein. Connections between each temple and temple tip include a bifurcated member on the temple tip for interaction with a post in the temple, by means of which both mechanical and electrical connection are effected when the two parts are joined together.

2 Claims, 7 Drawing Figures

INVENTOR.
ANTHONY DeLORENZO
BY
Barnes, Kisselle, Raisch & Choate
ATTORNEYS

EYEGLASS FRAME WITH HEARING AID

This invention relates to eyeglass frames with a hearing aid built therein.

BACKGROUND OF THE INVENTION

It is quite common to provide hearing aids in the temples of eyeglass frames. The common procedure is to include a microphone and amplifier in a temple of the frame. Where the user requires additional hearing help, both temples may be provided with a microphone and amplifier. The connection to the ear is then made through an earpiece from each temple.

However, where the user has one ear that is normal where the other ear with no hearing or with a severe loss, and it is desired to provide a biaural effect, it has heretofore been suggested to provide an amplifier element in one temple and the microphone element in the other and connect the same by leads extending across the frame front. Alternatively a microphone element may be also mounted in the temple with the amplifier element.

One of the problems with such a device is that in order to service this device the electrical connections must be preserved between the opposed temples so that the frame front with the associated lenses cannot be used during the repairs.

Among the objects of this invention are to provide an eyeglass frame with a hearing aid wherein the electrical element in the form of an amplifier or the like may be provided in one temple and the microphone in the other but wherein the temples can be completely removed from the frame front without the use of tools to permit repair, thereby permitting substitute temples to be temporarily used with the eyeglass frame front during the repairs; to provide such a device which can be adapted to eyeglass frames at relatively low cost; which requires minimum but careful use thereof.

SUMMARY

An eyeglass frame with a hearing aid which provides for a microphone being positioned in one temple and the amplifier in the other temple with electrical connections therebetween. Each temple is mechanically connected to a temple tip hinged to the frame front so that when the mechanical connection is broken to remove the temple from the temple tip, the electrical connections are also broken, thereby permitting ready removal and replacement of the temple with the electrical element therein.

DESCRIPTION

Figure 1:
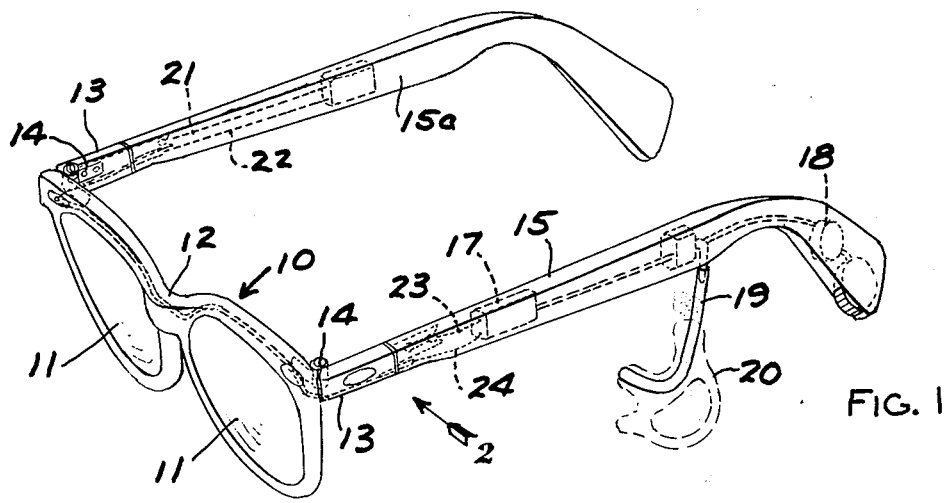
FIG. 1 is a perspective view of an eyeglass frame with the hearing aid therein.
Figure 2:
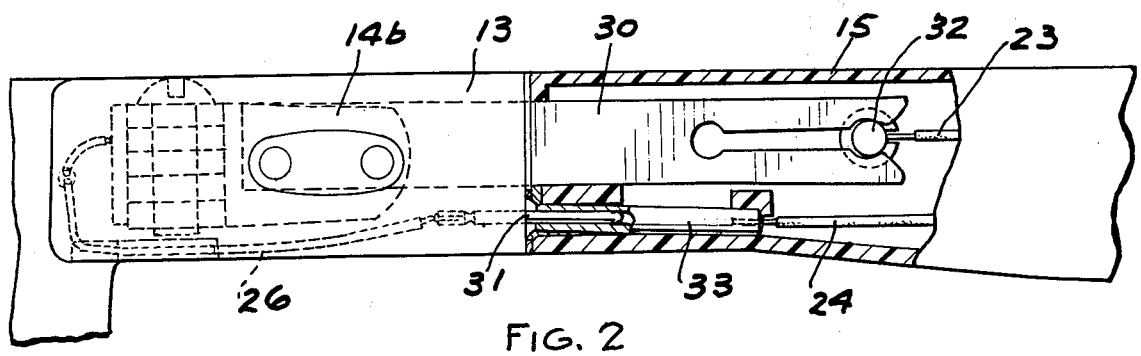
FIG. 2 is a fragmentary part sectional side elevational view of a portion of the frame shown in FIG. 1 taken in the direction of the arrow 2.
Figure 3:
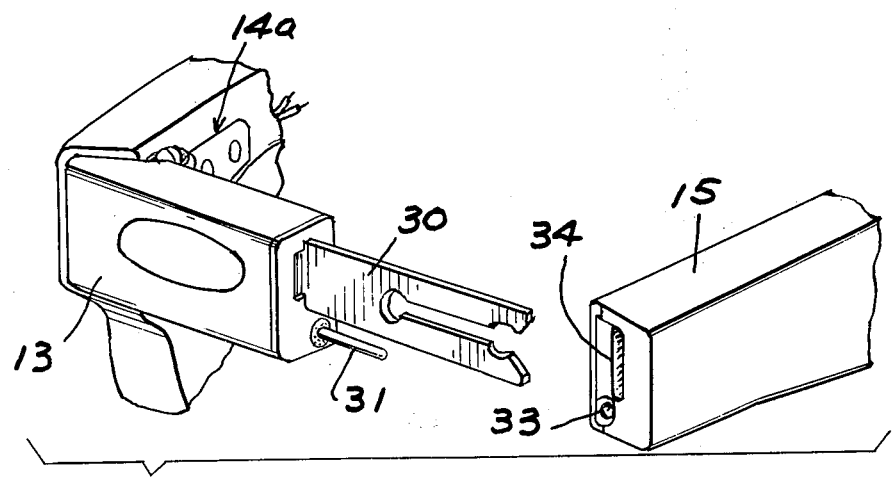
FIG. 3 is a fragmentary exploded perspective view showing the various parts.

Referring to FIG. 1, the invention comprises an eyeglass frame front 10 in which lenses 11 can be positioned which includes an interconnecting nosepiece 12. Temple tips 13 are hinged to the frame front 10 by metal hinges 14 and temples 15 are removably interconnected to the temple tips as presently described. One of the temples 15a is provided with a microphone element 16 while the other has an amplifier element 17 removably embedded therein. A second microphone may also be provided in the temple containing the amplifier. The amplifier 17 is of conventional construction and is connected electrically in accordance with conventional circuitry to a battery 18 and through a hearing tube 19 to an earpiece 20 positioned in the ear of the user.

In accordance with the invention, two leads 21, 22 extend from the microphone and are to be electrically connected with two leads 23, 24 to the amplifier.

Figure 4:
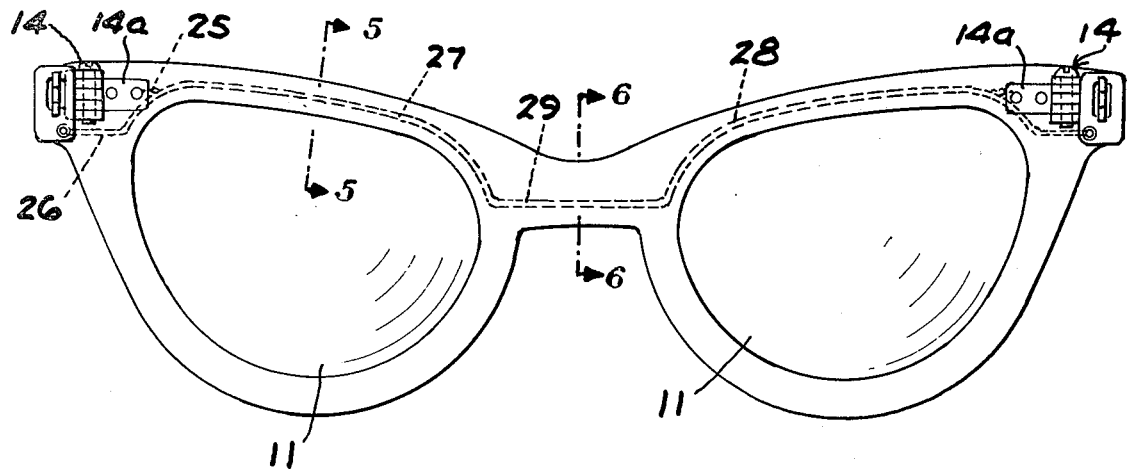
FIG. 4 is a front elevational view of the eyeglass frame embodying the invention.
Figure 5:
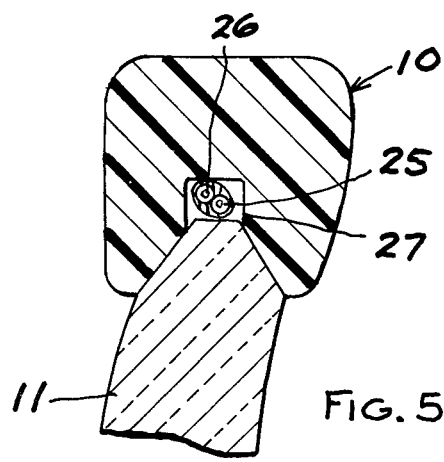
FIG. 5 is a sectional view on an enlarged scale taken along the line 5—5 in FIG. 4.
Figure 6:
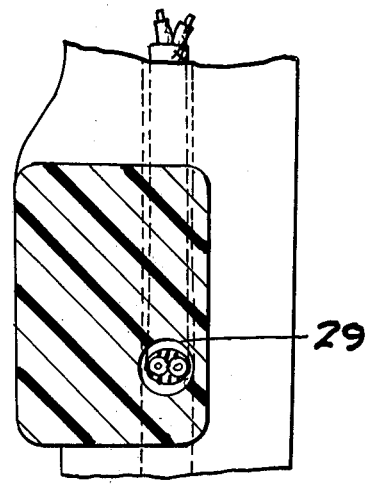
FIG. 6 is a fragmentary sectional view on an enlarged scale taken along the line 6—6 in FIG. 5.

This electrical connection is achieved by utilizing braided electrical leads 25, 26 that are embedded in a groove 27 above the lenses 11 and in the frame front 10, the grooves 27, 28 being interconnected by a passage 29 (FIG. 4).

Figure 7:
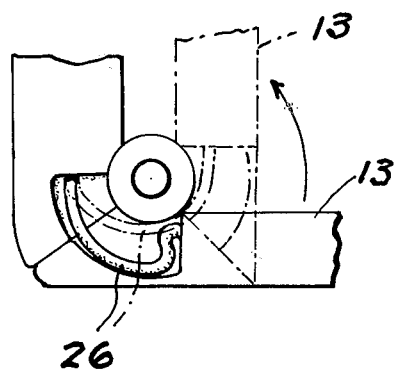
FIG. 7 is a fragmentary plan on an enlarged scale of a portion of the frame shown in FIG. 4.

As shown in FIG. 4, lead 25 is fixed to one leaf 14a of hinge 14 as by soldering while the lead 26 extends externally and rearwardly (FIG. 7). Similarly, the other ends of the leads 25, 26 are electrically connected to the leaf of hinge 14b and extend externally, respectively. Each hinge leaf 14b is electrically connected to a bifurcated connector 30 fixed in the associated temple tip 13 and extending externally therefrom. Each end of wire 26 is electrically connected to a projection or male element 31 that extends externally.

Each temple 15 is provided with a transversely extending post 32 to which one of the leads 21, 22 or 23, 24, as the case may be, is electrically connected. The other of the leads 22, 24 is electrically connected to a recess or female connector 33, the end of which extends to the end of the temple 15. The end of the temple is provided with a passage 34 into which the bifurcated element 30 extends.

When the temple 15 is attached to the temple tip 13, the bifurcated element 30 extends through passage 34 and mechanically connects onto post 32. This also provides an electrical connection between lead 23, the hinge 14 and wire 25 across the frame of the eyeglasses. Attachment of temple 15 to temple tip 13 also establishes a connection between connectors 31, 33 providing an electrical connection between the wires 24, 26 across the frame to the corresponding wires in the other temple.

By this arrangement, each temple is mechanically and electrically interconnected to the other through the eyeglass frame front.

By providing a microphone in one or both of the temples, the system may be adapted to persons having one or both ears that need hearing assistance.

When it is desired to repair one or both of the temples, they can be readily removed without the use of tools and replaced with either conventional temples or another unit while the temple needing repair is repaired.

I claim:

1. The combination comprising
an eyeglass frame front, a pair of temple tips connected to the frame front,
a pair of electrical lead wires mounted in said frame front, the free ends of said electrical lead wires extending to said temple tips,
a first electric hearing element in one temple,
a second electric hearing element in the other temple,
a first member on said temple tip to which one of said lead wires is connected,
a second member on said temple electrically connected to said hearing element in said temple,
said members having transversely engageable interlocking electrically conductive portions engageable upon relative axial movement of said temple tip and temple toward one another to form a mechanical and electrical connection between said members and the respective temple tip and temple,
and frictionally engageable electrically conductive members on said temple tip and said temple respectively, electrically connected to said other lead wire and said hearing element in said temple and engageable upon relative axial movement of said temple tip and temple toward one another to provide an electrical connection between said pair of members,
said first member comprising a bifurcated member, said second member comprising a stud engageable by said bifurcated member.

2. The combination set forth in claim 1 wherein said pair of members electrically connecting said temple and temple tip comprises a male member on one of said temple and temple tip to which said one electrical lead wire extends and a female member on the other of said temple and temple tip to which a lead from the associated electrical hearing element extends.

* * * * *